US006999269B2

(12) United States Patent
Johnson et al.

(10) Patent No.: US 6,999,269 B2
(45) Date of Patent: Feb. 14, 2006

(54) TWO-SIDED DATA STORAGE TAPE WITH SERVO INFORMATION ON BOTH SIDES OF THE TAPE

(75) Inventors: Douglas W. Johnson, Stillwater, MN (US); Richard W. Molstad, St. Paul, MN (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 154 days.

(21) Appl. No.: 10/664,140

(22) Filed: Sep. 17, 2003

(65) Prior Publication Data

US 2005/0057845 A1 Mar. 17, 2005

(51) Int. Cl.
*G11B 5/584* (2006.01)
(52) U.S. Cl. .................................... 360/77.12
(58) Field of Classification Search ............. 360/77.12, 360/75
See application file for complete search history.

(56) References Cited

U.S. PATENT DOCUMENTS

| 5,850,320 | A | | 12/1998 | Warmka et al. |
| 6,084,740 | A | | 7/2000 | Leonhardt et al. |
| 6,101,059 | A | * | 8/2000 | Wong et al. .................. 360/70 |
| 6,319,595 | B1 | | 11/2001 | Katashima et al. |
| 2002/0041982 | A1 | | 4/2002 | Katashima et al. |

* cited by examiner

*Primary Examiner*—David Hudspeth
*Assistant Examiner*—Mitchell Slavitt
(74) *Attorney, Agent, or Firm*—Eric D. Levinson (57) ABSTRACT

In general, the invention relates to a data storage tape including servo information on both sides of the tape. Techniques for writing servo information to both sides of the data storage tape are also described. For example, a mechanical arrangement of two servo write heads positioned with respect to the data storage tape can enable two-sided servo recording. In addition, a single servo write head may be used to write servo information to both sides of the data storage tape with the aid of a flux conductor. In that case, the magnetic field of the servo write head passes through the data storage tape to record servo information on both sides of the tape.

29 Claims, 9 Drawing Sheets

TWO-SIDED DATA STORAGE TAPE WITH SERVO INFORMATION ON BOTH SIDES OF THE TAPE

TECHNICAL FIELD

The invention relates to data storage media and, more particularly, to data storage tape that makes use of servo information.

BACKGROUND

Data storage media are commonly used for storage and retrieval of data, and come in many forms, such as magnetic tape, magnetic disks, optical tape, optical disks, holographic disks, cards or tape, and the like. Magnetic tape media remains an economical medium for storing large amounts of data. For example, magnetic tape cartridges, or large spools of magnetic tape are often used to back up large amounts of data for large computing centers. Magnetic tape cartridges also find application in the backup of data stored on smaller computers such as desktop or laptop computers.

In magnetic tape, data is typically stored as magnetic signals that are magnetically recorded on the medium surface. The data stored on the magnetic tape is often organized along "data tracks," and read/write heads are positioned relative to the data tracks to write data to the tracks or read data from the tracks. Other types of data storage tape include optical tape, magneto-optic tape, holographic tape, and the like.

As the number of data tracks on data storage tape increases, the data storage capacity of the data storage tape likewise increases. However, as the number of data tracks increases, the tracks usually become narrower and more crowded on the surface of the data storage tape. Accordingly, an increase in the number of data tracks can make positioning of the read/write head relative to a desired data track more challenging. In particular, for proper data storage and recovery, the read/write head must locate each data track, and follow the path of the data track accurately along the surface of the data storage tape. In order to facilitate precise positioning of the read/write head relative to the data tracks on the data storage tape, servo techniques have been developed.

Servo information refers to signals, patterns or other recorded markings on the data storage tape that are used for tracking purposes. In other words, servo information is recorded on the data storage tape to provide reference points relative to the data tracks. A servo controller interprets detected servo information and generates position error signals. The position error signals are used to adjust the lateral distance of the read/write head relative to the data tracks so that the read/write head is properly positioned along the data tracks for effective reading and/or writing of the data.

With some data storage tape, such as magnetic tape, the servo information is stored in specialized tracks on the medium, called "servo tracks." Servo tracks serve as references for the servo controller. Conventional servo tracks typically hold no data except for information that is useful to the servo controller to identify positioning of a read/write head relative to the surface of the data storage tape.

The servo information recorded in the servo tracks may be sensed by one or more servo heads. For example, servo heads may be dedicated heads that read only servo information in the servo tracks. Once the servo head locates a particular servo track, a data track can be located on the medium according to the data track's displacement from the servo track. The servo controller receives detected servo signals from the servo heads, and generates position error signals, which are used to adjust positioning of a read/write head relative to the data tracks.

Time-based servo techniques refer to servo techniques that make use of servo information and time variables. Time-based servo techniques are particularly effective for magnetic tape, which typically feeds past read/write heads at a constant velocity. For example, N-shaped servo markings, servo markings such as "<<< >>>" or "/// \\\," or the like, have been developed for time-based servo techniques. Such time-based servo information is typically formed in a servo track of the magnetic tape.

When time-based servo techniques are used, the time offset between detection of two or more servo marks can be translated into a position error signal, which defines a lateral distance of the read/write head relative to a data track. For example, given a constant velocity of magnetic tape formed with marking "/ \", the time between detection of "/" and "\" becomes larger when the servo head is positioned towards the bottom of marking "/ \" and smaller if the servo head positioned towards the top of marking "/ \". Given a constant velocity of magnetic tape, a defined time period between detected servo signals may correspond to a center of marking "/ \". By locating the center of marking "/ \", a known distance between the center of the servo track and the data tracks can be identified.

Amplitude-based servo information refers to servo information in which detection of the servo signal amplitude enables identification of head positioning relative to the medium. In other words, as the head passes relative to the data storage tape, signal amplitudes of detected servo information can be used to determine whether the head is positioned correctly relative to a track on the medium. For example, amplitude-based servo windows can be positioned above and below a track centerline to define the centerline. Amplitude-based servo information is also commonly implemented in magnetic tape media.

SUMMARY

In general, the invention relates to a data storage tape having servo information written to both sides of the tape. In various embodiments, the data storage tape may be magnetic, optical, holographic, or the like. Various techniques for writing servo information to a first and second side of the data storage tape are also described.

In some embodiments, servo writing techniques, described herein, include writing the servo information with a number of servo write heads. For example, a mechanical arrangement of two servo write heads positioned relative to the data storage tape can allow each servo write head to write servo information on a unique side of the data storage tape. In that case, the data storage tape can be unspooled, written with servo information on both sides of the tape via different servo write heads, and then re-spooled.

In other embodiments, a single servo write head may write both sides of the data storage tape with the aid of a flux conductor. For example, the flux conductor may be positioned on an opposing side of the data storage tape relative to the servo write head. In that case, the magnetic field from the servo write head passes through the data storage tape to write servo information on both sides of the tape. The presence of the flux conductor helps control the magnetic flux so that the servo information is properly written on the side of the tape opposite the servo write head. In this manner, the servo information can be simultaneously recorded on both sides of the data storage tape. Moreover, when a flux conductor is used with a servo write head to simultaneously record servo information on both sides of the tape, the servo information on one side of the tape comprises the mirror image of the servo information on the other side of the tape.

In one embodiment, the invention is directed to a method including writing first servo information to a first side of a data storage tape, and writing second servo information to a second side of the data storage tape.

In another embodiment, the invention is directed to a data storage tape including a first and a second side, first servo information on the first side, and second servo information on the second side.

In another embodiment, the invention is directed to a system. The system includes a data storage tape including a first and second side, and a servo write head positioned in proximity to the first side to generate a magnetic field and write first servo information on the first side. The system further includes a flux conductor positioned in proximity to the second side opposite the servo write head to affect the magnetic field in order to write second servo information on the second side.

In another embodiment, the invention is directed to a magnetic data storage tape comprising a first side and a second side, first servo information on the first side of the magnetic data storage tape, and second servo information on the second side, wherein the second servo information is the mirror image of the first servo information.

In another embodiment, the invention is directed to a system comprising a data storage tape including a first and second side and a first servo write head positioned in proximity to the first side to write first servo information on the first side. In that case, the system further includes a second servo write head positioned in proximity to the second side to write second servo information on the second side.

The invention may be capable of providing a number of advantages. For example, servo information recorded on both sides of data storage tape may increase the storage density in data storage tape. In addition, the techniques for writing the servo information to both sides of the tape simplify and/or accelerate the fabrication of the data storage tape. Furthermore, the techniques for writing the servo information to both sides of the tape may improve the quality of the data storage tape relative to conventional techniques. In some embodiments, the invention allows for the simultaneous writing of servo information to both sides of a data storage tape, which can accelerate the fabrication process. Moreover, the servo information on a first side of the tape may be the mirror image of the servo information on a second side of the tape.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
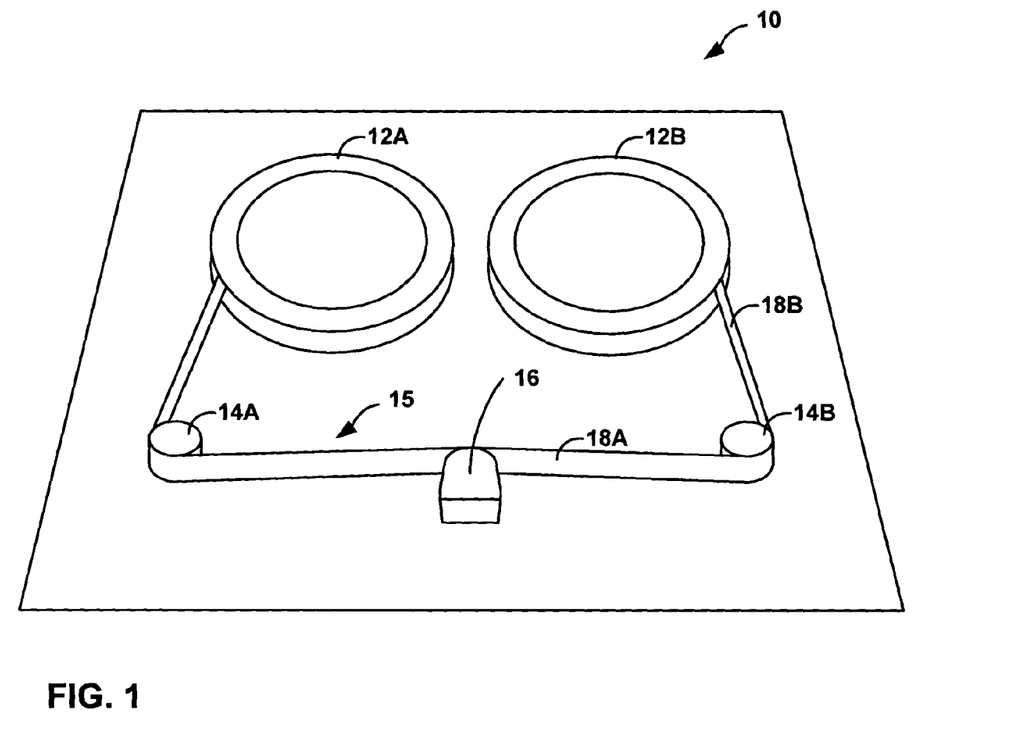
FIG. 1 is a schematic perspective view illustrating first and second sides of a data storage tape within an exemplary data storage tape system.

FIG. 1 is a schematic perspective view illustrating first and second sides of a data storage tape within an exemplary data storage tape system. The data storage tape system 10 includes a first spool 12A, a second spool 12B, a mechanical arrangement of guides 14A and 14B, a servo write head 16, and a data storage tape 15. Data storage tape 15 includes a first side 18A and a second side 18B. In an exemplary embodiment, data storage tape 15 comprises magnetic tape, although various aspects of the invention may also apply to optical tape, magneto-optic tape, holographic tape, or the like. Data storage tape 15 may be housed in a cartridge, although the invention is not limited in that respect. In that case, spools 12 would likewise be housed within the tape cartridge. As described in greater detail below, first side 18A of data storage tape 15 is recorded with first servo information and second side 18B of data storage tape 15 is recorded with second servo information. In this manner, the storage density of data storage tape 15 can be increased.

Figure 2A:
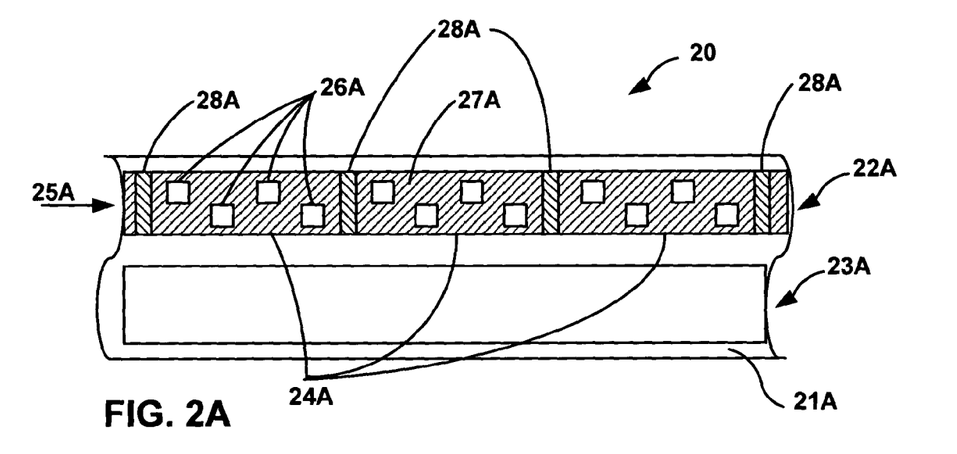
FIGS. 2A and 2B are conceptual diagrams respectively illustrating first and second sides of a data storage tape including amplitude-based servo information on both sides of the tape.
Figure 2B:
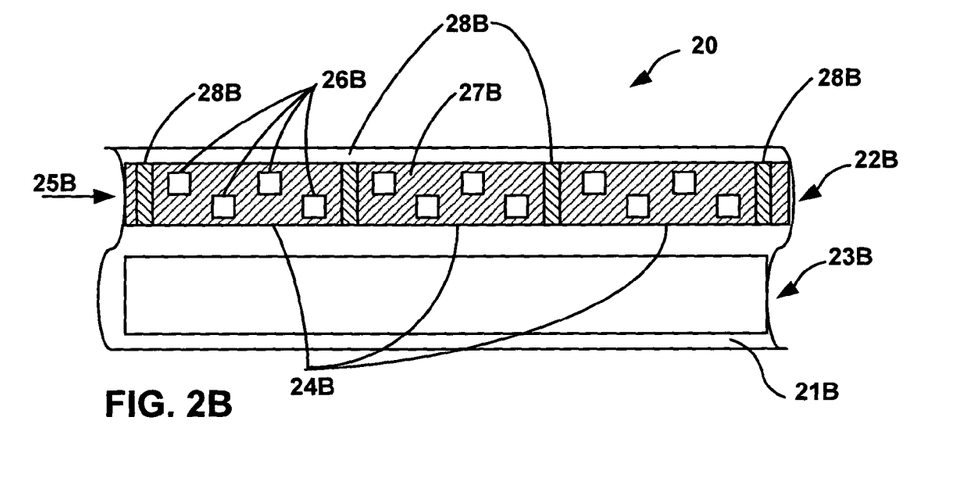

FIGS. 2A and 2B are conceptual diagrams respectively illustrating a first side 21A and a second side 21B of a data storage tape 20, which may correspond to data storage tape 15 (FIG. 1). In particular, first side 21A and second side 21B respectively include amplitude-based servo information 22A and 22B recorded on the respective sides 21A, 21B of the tape 20. For example, amplitude-based servo information 22A, 22B may comprise a recorded signal that is selectively erased in order to define erased servo windows, or alternatively may comprise servo windows selectively recorded on the data storage tape 20. In either case, servo windows 26A, 26B are positioned above and below a centerline 25A, 25B associated with a servo track for each of numerous servo frames 24A, 24B along the respective track.

The amplitude-based servo information 22A, 22B on sides 21A, 21B of data storage tape 20 each include a single servo track. However, additional servo tracks may be used, if desired. Also, multiple servo bands may be included on each side 21A, 21B.

For amplitude-based servo information 22A, 22B, servo windows 26A, 26B are positioned above and below a respective centerline 25A, 25B of the respective servo track. The respective centerline 25A, 25B of the respective servo track may reside a known distance from one or more data tracks 23A, 23B. As a head moves relative to the servo track along the centerline 25A or 25B, the amplitude of the detected signal changes as the head passes partially over the servo windows 26A, 26B allowing for head positioning to be determined relative to the respective centerline 25A, 25B.

The amplitude-based servo information 22A, 22B can be written by passing the sides 21A and 21B of data storage tape 20 under gaps of different servo write heads. A relatively wide gap in the servo heads can be used to record magnetic signals 27A and 27B on the respective sides 21A and 21B of data storage tape 20. Magnetic signals 27A and 27B may comprise periodic or sinusoidal signals at a first frequency. A magnetic signal having a second frequency may define transition regions 28A, 28B between the individual frames of data storage tape 20. If desired, transition region 28A may also include a longitudinal erase field within the transition region, e.g., for recording linear positioning (LPOS) information. In any case, the transition regions 28A, 28B serve as synchronization markings so that when signal amplitude indicates head positioning that is off-track, the head controller can determine whether to move the magnetic head laterally up or down in order to remedy the off-track head positioning. For example, with common sized servo windows 26A, 26B, the head controller could become out of sync if a transition region 28A, 28B or another type of synchronization mechanism is not used. Alternatively, the respective servo windows 26A, 26B that are above and below centerlines 25A, 25B may be recorded or erased to have different widths, which can allow for self-synchronization.

In one example, servo write heads (or separate erase heads) having a relatively small write gap widths in a direction transverse to the servo track direction can be used to create erased servo windows 26A, 26B. For example, erased servo windows 26A, 26B may form a checkerboard-like configuration on respective sides 21A, 21B. In operation, the position of servo windows 26A, 26B relative to magnetic signals 27A, 27B can accurately define the track location of centerlines 25A, 25B of the servo tracks. As shown in FIGS. 2A and 2B, sides 21A and 21B of the data storage tape may be written to have substantially identical amplitude-based servo information.

Figure 3A:
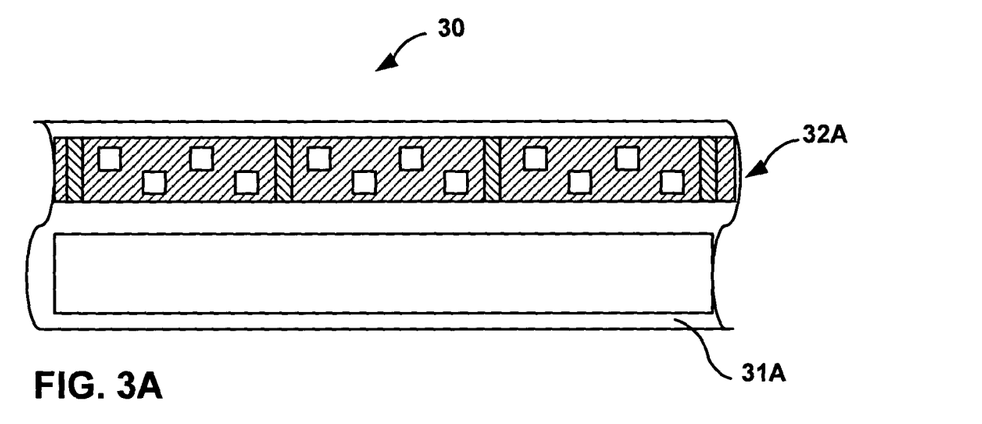
FIGS. 3A and 3B are conceptual diagrams respectively illustrating first and second sides of a data storage tape including amplitude-based servo information on both sides of the tape, wherein the servo information on the first side is the mirror image of the servo information on the second side.
Figure 3B:
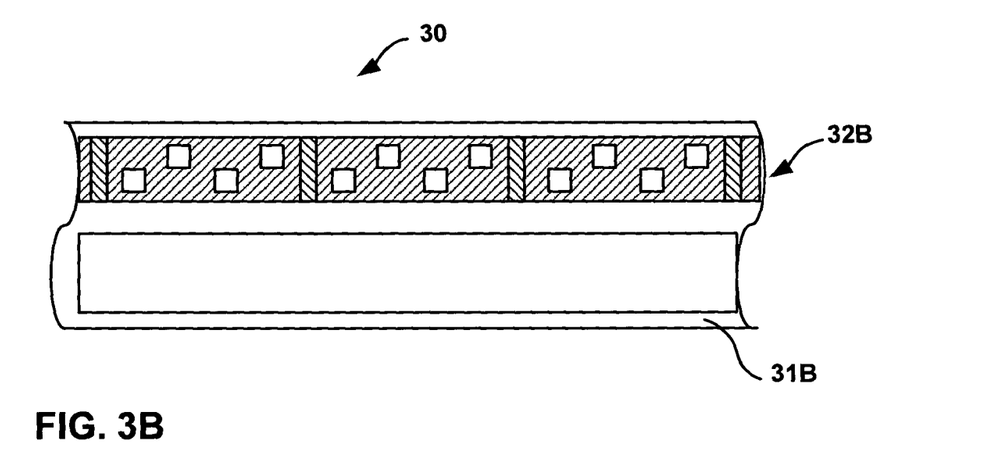

FIGS. 3A and 3B are conceptual diagrams respectively illustrating first side 3 1A and second side 31B of a data storage tape 30 including amplitude-based servo information 32A, 32B on both sides of tape 30. Moreover, as illustrated in FIGS. 3A and 3B, amplitude-based servo information 32A on first side 31A is the mirror image of amplitude-based servo information 32B on second side 31B.

As described in greater detail below, amplitude-based servo information 32A, 32B that are mirror images of one another can be written simultaneously. In particular, a servo write head may write through data storage tape 30 to simultaneously write amplitude-based servo information 32A and 32B on respective sides 31A and 31B. In order to aid the simultaneous writing of amplitude-based servo information 32A and 32B through medium 30, a flux conductor may be used. Additional details of a servo writing system using a servo write head and a flux conductor to simultaneously write servo information on both sides of magnetic tape are provided below.

Figure 4A:
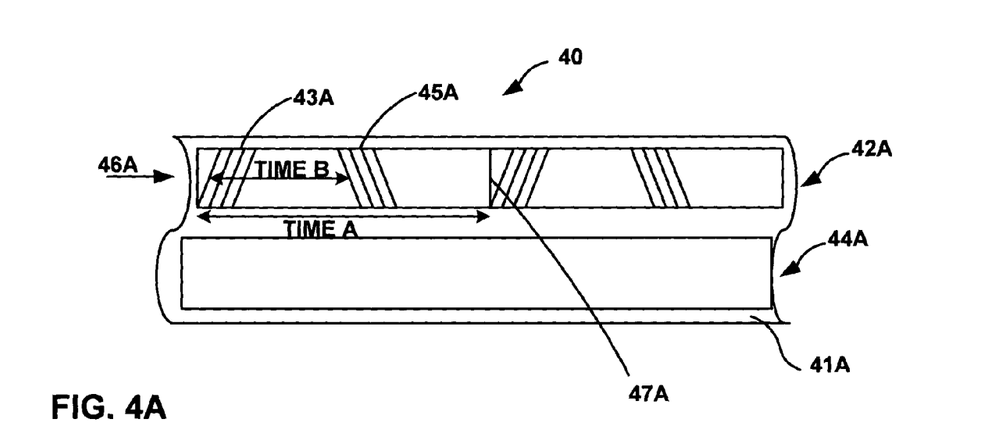
FIGS. 4A and 4B are conceptual diagrams respectively illustrating first and second sides of a data storage tape including time-based servo information on both sides of the tape.
Figure 4B:
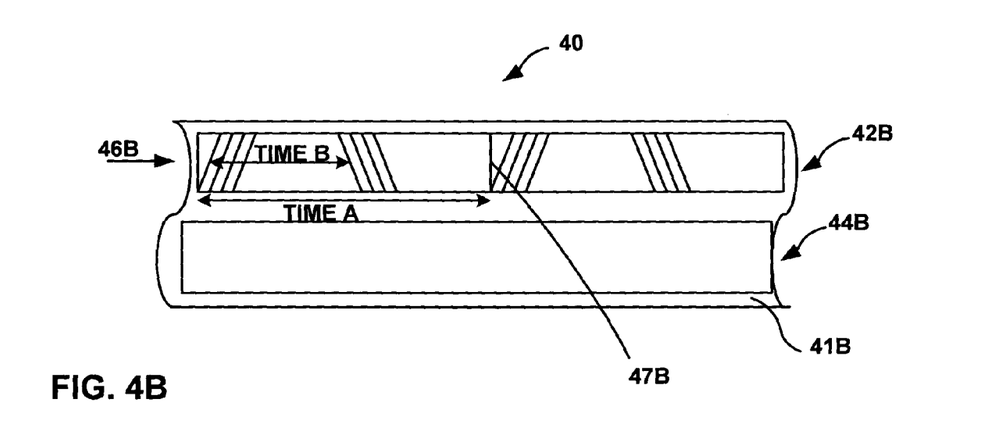

FIGS. 4A and 4B are conceptual diagrams respectively illustrating first side 4 1A and second side 41B of a data storage tape 40 including first time-based servo information 42A on first side 41A and second time-based servo information 42B on second side 41B. Time based servo techniques exploit time-based servo information 42A, 42B in conjunction with time variables in order to pinpoint locations on data storage tape 40. In particular, when time-based servo techniques are used, the time offset between detection of two or more servo marks can be translated into a position error signal, which defines a lateral distance of the read/write head relative to a data track. For example, given a constant velocity of magnetic tape formed with marking "/ \", the time between detection of "/" and "\" becomes larger when the servo head is positioned towards the bottom of marking "/ \" and smaller if the servo head positioned towards the top of marking "/ \". Given a constant velocity of magnetic tape, a defined time period between detected servo signals may correspond to a centerline 46A of marking "/ \". By locating the center of marking "/ \", a known distance between the center of the servo track and the data tracks can be identified. In some cases, numerous servo bands are included on each respective side 41A, 42B of tape data storage tape 40.

As illustrated in FIGS. 4A and 4B, first time-based servo information 42A is recorded on a first side 41A of a data storage tape 40 and second servo 42B is recorded on second side 41A. Two frames of time-based servo information 42A, 42B, separated by boundaries 47A, 47B are illustrated. One or more data tracks 44A, 44B may reside a known distance from centerlines 46A, 46B or servo information 42A. Thus, by locating a position of a servo head relative to servo information 42A, a position error signal can be generated to identify lateral positioning error of the read/write head relative to one or more data tracks 44A, 44B.

In conventional time-based servo techniques servo information may comprise individual marks such as "/// \\\" as illustrated in FIG. 4A, other individual marks such as "<<< >>>" or N-shaped marks. As illustrated in FIG. 4A, time (A) represents the time associated with one servo frame, whereas time (B) represents the time between two specific servo marks, in this case, the time between detection of marks 43A and 45A. Time (A) is generally fixed, regardless of the lateral positioning of a servo head that detects the markings. However, time (13) changes depending on such positioning. For example, time (B) becomes larger as servo head positioning is moved towards the bottom of time-based servo information 42A, 42B. Given a constant speed of data storage tape 40, time (B) can be use to generate one or more position error signals. Alternatively, the ratio of time (B) to time (A) can be use to generate one or more position error signals. In the later case, time (A) can normalize the ratio to account for any variance in tape speed. Importantly, in accordance with the invention, time-based servo information 42A and 42B is recorded on both sides 41A and 41B of data storage tape 40, which can improve the storage density of data storage tape 40. In FIGS. 4A and 4B the time-based servo information 42A and 42B is substantially identical on respective sides 41A and 42B.

Figure 5A:
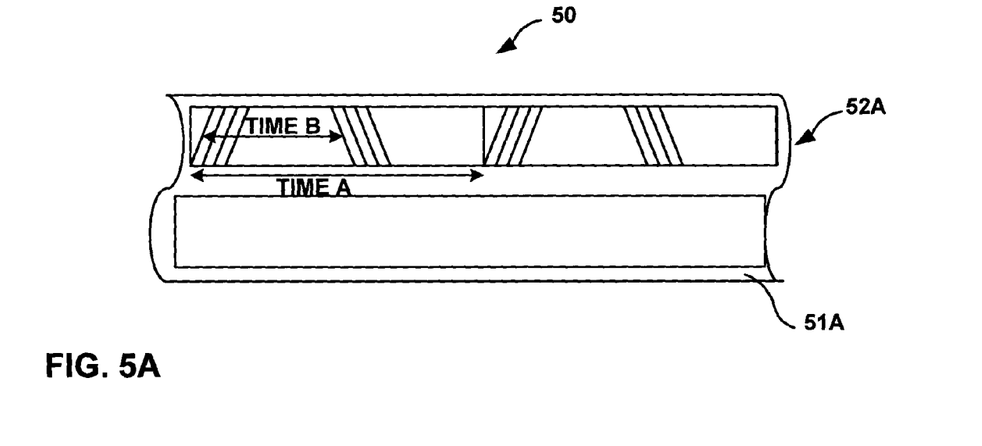
FIGS. 5A and 5B are conceptual diagrams respectively illustrating first and second sides of a data storage tape including time-based servo information on both sides of the tape, wherein the servo information on the first side is the mirror image of the servo information on the second side.
Figure 5B:
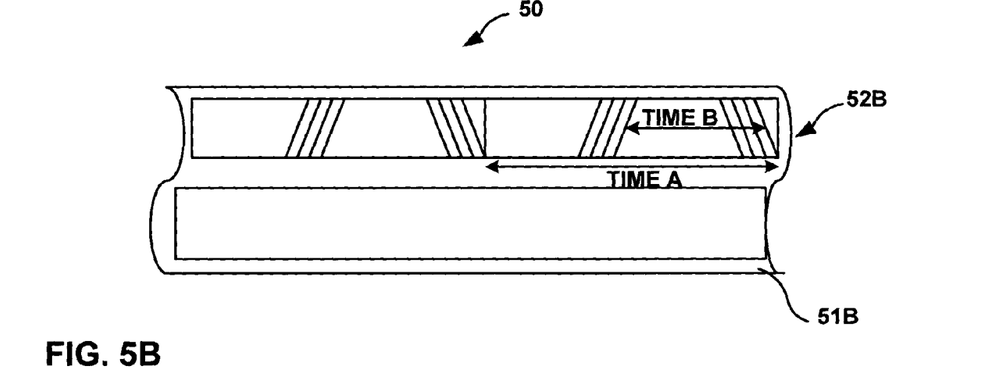

FIGS. 5A and 5B are conceptual diagrams respectively illustrating first and second sides 51A and 51B of a data storage tape 50 including time-based servo information 52A, 52B on first and second sides 51A, 51B. Moreover, as illustrated in FIGS. 5A and 5B time-based servo information 52A on first side 51A is the mirror image of time-based servo information 52B on second side 51B.

As described in greater detail below, time-based servo information 52A, 52B that are mirror images of one another can be written simultaneously. In particular, a servo write head may write through data storage tape 50 to simultaneously write time-based servo information 52A and 52B on respective sides 51A and 51B. In order to aid the simultaneous writing of amplitude-based servo information 52A and 52B through medium 50, a flux conductor may be used. Additional details of a servo writing system using a servo write head and a flux conductor to simultaneously write servo information on both sides of magnetic tape are provided below.

Figure 6:
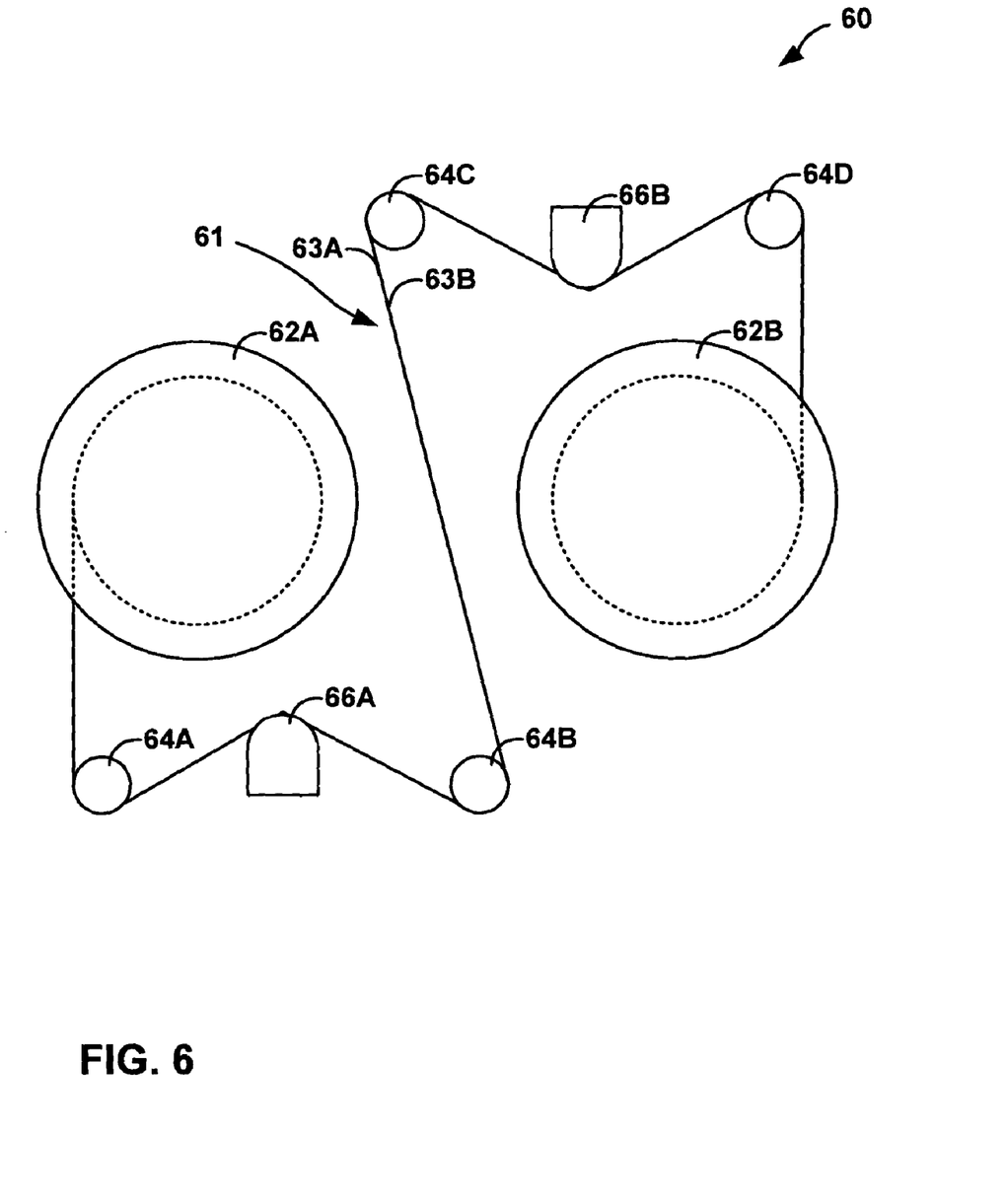
FIG. 6 is a schematic diagram illustrating an exemplary system for writing servo information to both sides of a data storage tape on a single pass according to an embodiment of the invention.

FIG. 6 is a schematic diagram illustrating an exemplary system 60 for writing servo information to both sides of a data storage tape 61 on a single pass according to an embodiment of the invention. The servo information may include time-based servo information or amplitude-based servo information.

System 60 may include data storage tape 61 with a first side 63A and second side 63B. Spools 62A and 62B (collectively spools 62) hold data storage tape 61. Data storage tape 61 may correspond to data storage tape 20 (FIG. 2) or data storage tape 30 (FIG. 3). In system 60, data storage tape is unspooled from first spool 62, written with servo information on both sides 63A, 63B and then re-spooled on second spool 62. System 60 may also include a mechanical arrangement of guides 64A, 64B, 64C, and 64D (collectively guides 64) to define a tape path through system 60.

System 60 also includes a first servo write head 66A to write first servo information to first side 63A of data storage tape 61 and a second servo write head 66B to write second servo information to second side 63B of data storage tape 61. Servo write heads 66A and 66B may generally comprise conventional servo heads that write or erase signals in order to create servo information on both sides 63A, 63B of data storage tape 61. In addition, servo write heads 66A, 66B may be controlled by conventional write head drivers. In one embodiment, the same write driver drives both servo write heads 66A, 66B. In particular, servo write heads 66A, 66B may share a common write current source, which can simplify system 60.

System 60 shows an exemplary implementation that may write to both sides 63A, 63B of data storage tape 61 in a signal pass, i.e., a single unwinding and re-winding of data storage tape 61 from first spool 62A to second spool 62B. Other mechanical arrangements of guides 64 and servo write heads 66A and 66B, however, may also allow for writing to both sides of data storage tape 61. By facilitating the writing or erasing of signals to record servo information on both sides 63A, 63B of data storage tape 61 in a single pass, the fabrication of two-sided data storage tape with servo information on both sides can be accelerated.

Figure 7:
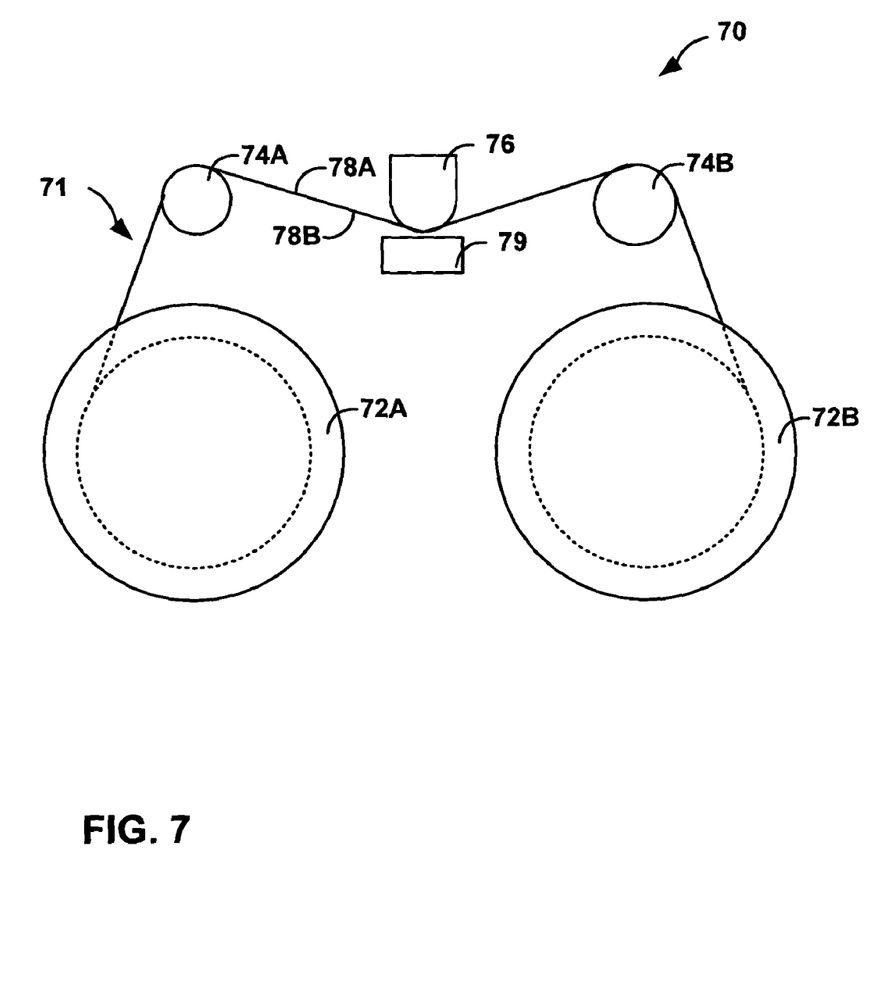
FIG. 7 is a schematic diagram illustrating an exemplary system for writing servo information to both sides of a data storage tape simultaneously.

FIG. 7 is a schematic diagram illustrating another exemplary system 70 for writing servo information to both sides of a data storage tape 71. In particular, system 70 enables the simultaneous recording or erasing of first servo information to first side 78A and second servo information to second side 78B. The servo information may include either time-based servo information or amplitude-based servo information. For example, data storage tape 71 may correspond to data storage tape 30 (FIG. 3) or data storage tape 50 (FIG. 5).

Exemplary system 70 comprises a data storage tape 71 with a first side 78A and second side 78B, spools 72A and 72B (collectively spools 72) that hold the data storage tape, and a mechanical arrangement of guides 74A and 74B (collectively guides 74) to define a tape path through system 70. System 70 also includes a servo write head 76 to write or erase servo information to first side 78A of data storage tape 71 as data storage tape 71 is transferred from first spool 72A to second spool 72B. Moreover a flux conductor 79 can be positioned on an opposing side of data storage tape 71, relative to servo write head 76. Flux conductor 79 affects the magnetic field generated by servo write head 76 in order to cause servo information to be recorded or erased from second side 78B. In other words, servo write head 76 creates a magnetic field that passes through data storage tape 71, and, with the aid of flux conductor 79, causes servo information to be written to both first side 78A and second side 78B of data storage tape 71. Moreover, the servo information written to first side 78A comprises a mirror image of the servo information written to second side.

Flux conductor 79 may comprise a soft magnetic material, e.g., any magnetically permeable material. For example, a magnetically permeable material may include magnetically soft ferrite, metal alloys such as nickel or iron alloys, cold rolled steel, or the like. In one embodiment, the shape of flux conductor 79 defines a curvature substantially similar to that of servo write head 76. Moreover, flux conductor 79 may be approximately the same size as servo write head 76. In some cases, flux conductor 79 may comprise a servo write head substantially identical to servo write head 76, but not driven by a current source. In other words, flux conductor 79 may be realized as another passive head, i.e., a head that is not driven with a current source and, thus, does not create its own magnetic field.

System 70 shows one exemplary implementation that may write to both sides 78A, 78B of data storage tape 71 simultaneously and in a single pass. Other mechanical arrangements of guides 74 or other elements, for example, may also be used. In any case, writing servo information to both sides 78A, 78B of data storage tape 71 simultaneously and in a single pass can simplify and accelerate fabrication of high-density, two-sided data storage tape.

Figure 8:
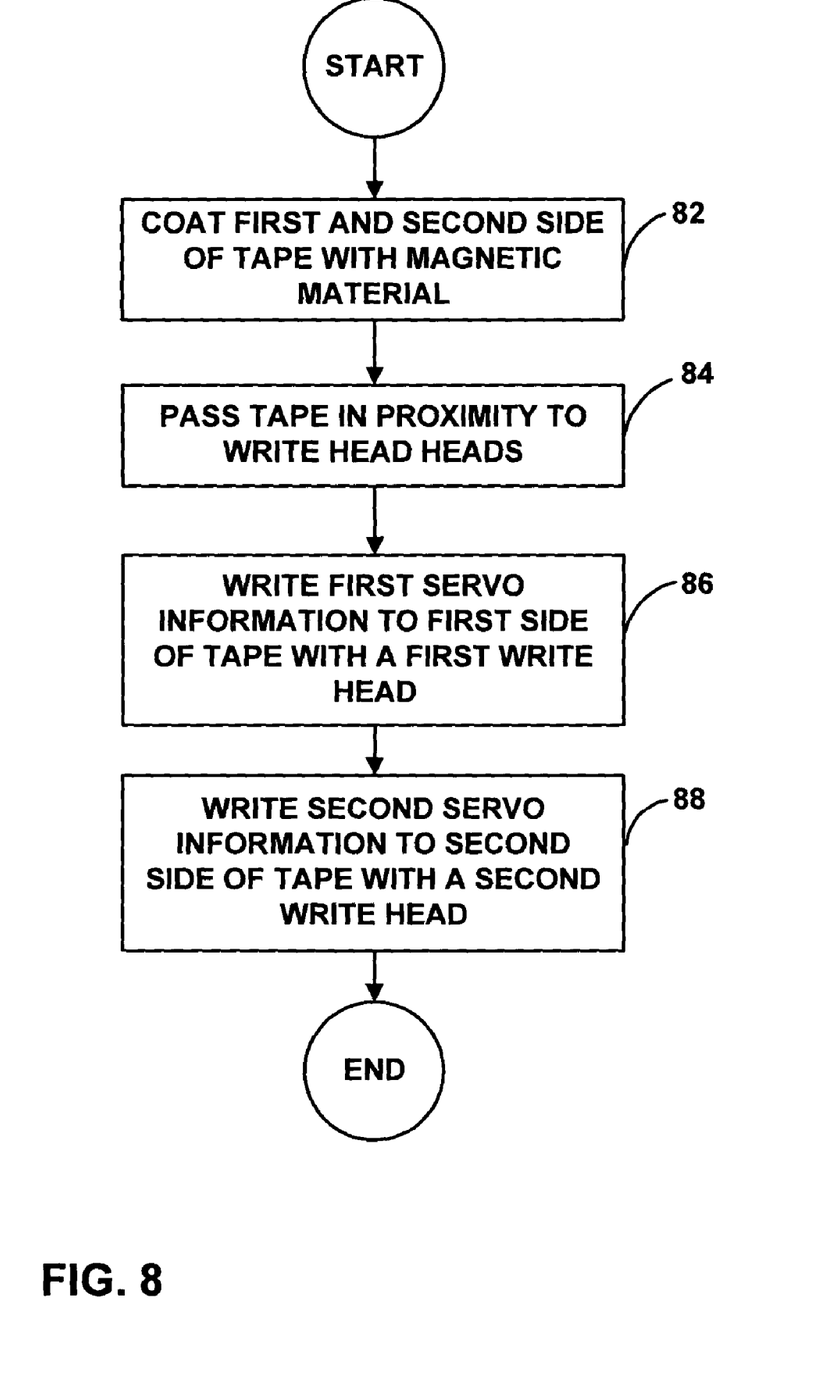
FIG. 8 is a flow diagram that illustrates exemplary operation of a system that may use two servo write heads to write both sides of data storage tape in a single pass.

FIG. 8 is a flow diagram that illustrates exemplary operation of a system 60 including two servo write heads 66A, 66B to write servo information to both sides 63A, 63B of data storage tape in a single pass. Prior to being placed in system 60, data storage tape 61 may be coated with a magnetic material (82) on both sides 63A and 63B. In particular, a substrate film may be coated with a nonmagnetic underlayer on both sides, followed by one or more magnetic layers on both sides. If desired, a calendaring process, or the like, may be used to compress and smooth the coated magnetic material on both sides of the tape. In addition, if the coating is applied on a relatively wide stockroll, the wide roll of tape is typically cut in a slitting process to realize a number of narrow, magnetically-coated tape strands cut to the desired width and having magnetic coatings on both sides.

Once coated with a magnetic material, data storage tape 61 is placed into system 60, wherein data storage tape 61 is fed from first spool 62A to second spool 62B through guides 64 and in proximity to servo write heads 66A, 66B (84). In particular, first side 63A of data storage tape 61 is passed in proximity to first servo write head 66A and second side 63B of data storage tape 61 is passed in proximity to second servo write head 66B. The respective servo write heads 66A, 66B may contact the data storage tape on the respective sides 63A, 63B, although the invention is not necessarily limited in that respect. In any case, first servo write head 66A writes first servo information to first side 63A of data storage tape 61 (86), and second servo write head 66B writes second servo information to second side 63B of data storage tape 61 (88). In this manner, two-sided data storage tape 61 having servo information on both sides can be realized. Moreover, such creation of two-sided data storage tape 61 can be accelerated by the fact that two servo heads 66A, 66B perform writing or erasing of servo information in a single pass, i.e., a single unwinding and re-winding of data storage tape 61 from first spool 62A to second spool 62B.

Figure 9:
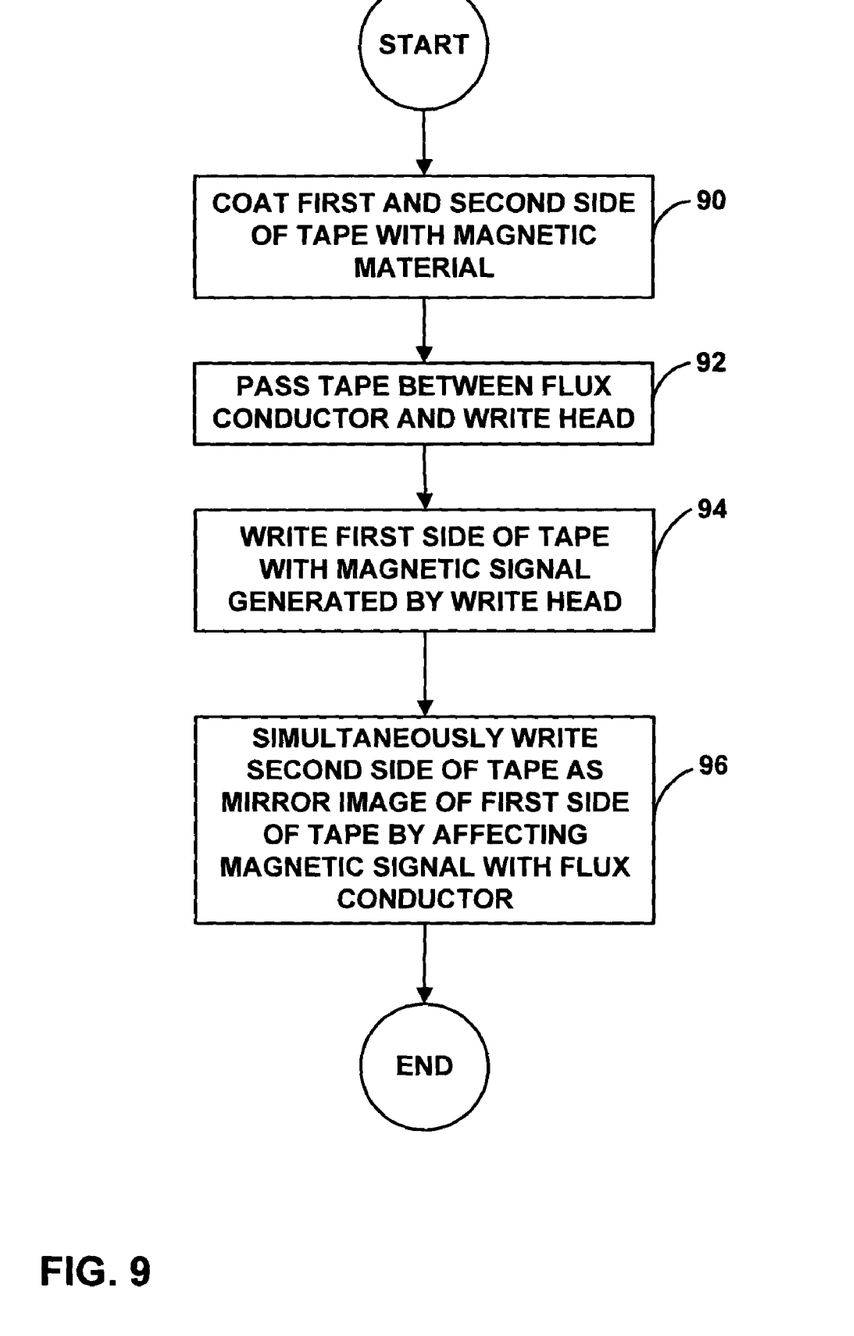
FIG. 9 is a flow diagram that illustrates exemplary operation of a system that may use a single servo write head to write both sides of data storage tape simultaneously.

FIG. 9 is a flow diagram that illustrates exemplary operation of a system 70 using a single servo write head 76 to write both sides of data storage tape simultaneously. As shown, in FIG. 9 data storage tape 71 is coated with a magnetic material (90) on both sides 78A and 78B. Again, for example, a film may be coated with a nonmagnetic underlayer followed by a magnetic layer on both sides, and a calendaring process and slitting process may also be performed.

In any case, once the first and second sides have been coated with magnetic material (90), the data storage tape is passed between a servo write head 76 and a flux conductor 79 (92). As indicated above, flux conductor 79 may comprise soft magnetic material such as magnetically soft ferrite, a nickel or iron alloy, cold rolled steel, or the like. Moreover, flux conductor 79 may be approximately the same size and shape as write head 76. The data storage tape 71 may be guided by a mechanical arrangement of guides 74 as the tape is transferred from first spool 72A to second spool 72B.

Servo write head 76 writes first servo information to first side 78A of data storage tape 71 (94) by applying a magnetic field. The magnetic field may propagate through the data storage tape 71. Flux conductor 79 affects the magnetic field generated by the servo write head 76 such that second servo information is written on second side 78B of data storage tape 71 (96). In this manner, servo information can be written to both sides of data storage tape 71 simultaneously during a single pass, i.e., a single unwinding and re-winding of data storage tape 71 from first spool 72A to second spool 72B. Moreover, the servo information written on first side 78A may be a mirror image of the servo information on second side 78B. In that case, when a servo read head is used to read the servo information on a respective side, it can be programmed to know the relative layout of the servo information on any given side of the data storage tape.

Various embodiments of the invention have been described. For example, two-sided data storage tape having servo information on both sides has been described. In some cases, in accordance with the invention, the servo information on a first side may be a mirror image of the servo in formation on a second side. Various fabrication techniques and servo writing systems have also been described for creating such two-sided data storage tape with servo information on both sides. These and other embodiments are within the scope of the following claims.

What is claimed is:

1. A method comprising:
    writing first servo information to a first side of a data storage tape; and
    writing second servo information to a second side of the data storage tape, wherein first and second servo information comprises servo information selected from a group consisting of time-based servo information and amplitude-based servo information.

2. The method of claim 1, further comprising coating magnetic coatings on both sides of the data storage tape prior to writing the first and second servo information.

3. The meted of claim 1, wherein the data storage tape is a magnetic data storage tape.

4. The method of claim 1, further comprising simultaneously writing the first and second servo information.

5. The method of claim 1, further comprising:
    unspooling the data storage tape from a first spool;
    passing the first and second sides of the data storage tape in proximity to a first and a second servo write head respectively to write the first and second servo information and
    re-spooling the data storage tape to a second spool.

6. The method of claim 1, further comprising:
    writing the first servo information on the first side of the data storage tape with a first servo write bead, and
    writing the first servo information on the second side of the data storage tape with a second servo write head.

7. The method of claim 1, further comprising writing through the data storage tape to simultaneously write the first and second servo information on the first and second sides of the data storage tape.

8. The method of claim 1, wherein a servo write head is positioned on the first side of the data storage tape and a flux conductor is positioned on the second side of the data storage tape.

9. The method of claim 8, wherein the flux conductor comprises soft magnetic material.

10. The method of claim 8, wherein the flux conductor affects a magnetic field generated by the servo write head such that the second servo information is written on the second side of the data storage tape via the magnetic field.

11. The method of claim 1, wherein the first servo information on the first side of the data storage tape is substantially a mirror image of the second servo information on the second side of the data storage tape.

12. The method of claim 1, wherein writing the first and second servo information comprises writing the first and second servo information in a plurality of servo frames of servo tracks that extend along a length of the data storage tape on the first and second sides.

13. The method of claim 1, wherein writing the first and second servo information includes applying a magnetic field.

14. The method of claim 1, wherein writing the first and second servo information includes selectively erasing a portion of a magnetic signal from the data storage tape.

15. A data storage tape comprising:
    a first and a second side;
    first servo information on the first side; and
    second servo information on the second side, wherein first and second servo information comprises servo information selected from a group consisting of time-based servo information and amplitude-based servo information.

16. The data storage tape of claim 15, wherein the servo information on the first side of the tape is substantially a mirror image of the servo information on the second side of the tape.

17. The data storage tape of claim 15, wherein the servo information on the first side of the tape is substantially identical to the servo information on the second side of the tape.

18. The data storage tape of claim 15, wherein first and second servo information comprise time-based servo information in one or more servo tracks that define a plurality of servo frames extending along the one or more servo tracks.

19. The data storage tape of claim 15, wherein first and second servo information comprise amplitude-based servo information in one or more servo tracks that define a plurality of servo frames extending along the one or more servo tracks.

20. The data storage tape of claim 15, wherein the data storage tape is magnetic tape.

21. The data storage tape of claim 15, wherein the data storage tape is included in a data storage cartridge.

22. A system comprising:
a data storage tape including a first and second side;
a servo write head positioned in proximity to the first side to generate a magnetic field and write first servo information on the first side; and
a flux conductor positioned in proximity to the second side opposite the servo write head to affect the magnetic field to write second servo information on the second side.

23. The system of claim 22, wherein the flux conductor comprises soft magnetic material.

24. The system of claim 23, wherein the magnetic field passes through the data storage tape to simultaneously write the first and second servo information on the first and second sides of the data storage tape.

25. The system of claim 24, further comprising:
a first spool and a second spool; and
a mechanical arrangement of guides to define a tape path of the data storage tape from the first spool to the second spool.

26. A system comprising:
a data storage tape including a first and second side;
a first servo write head positioned in proximity to the first side to write first servo information on the first side; and
a second servo write bead positioned in proximity to the second side to write second servo information on the second side, wherein the first and second servo information comprises servo information selected from a group consisting of time-base servo information and amplitude-based servo information and the first and second servo write heads are configured to write the first and second servo information in a plurality of servo frames that extend along servo tracks respectively on the first and second sides of the data storage tape.

27. The system of claim 26, further comprising:
a first spool and a second spool; and
a mechanical arrangement of guides to define a tape path of the data storage tape from the first spool to the second spool.

28. A magnetic data storage tape comprising:
a first side and a second side;
first servo information in a first servo track on the first side of the magnetic data storage tape, wherein the first servo track includes a plurality of servo frames; and
second servo information in a second servo track on the second side of the magnetic data storage tape, wherein the second servo track includes a plurality of frames, wherein the first and second servo information comprise servo information selected from a group consisting of time-based servo information and amplitude-based servo information, and wherein the second servo information is substantially a mirror image of the first servo information.

29. The magnetic data storage tape of claim 28, wherein the first and second servo information is written to the magnetic storage tape by a process comprising:
passing the data storage tape between a flux conductor and a servo write head; and writing through the data storage tape to simultaneously write the first and second servo information on the first and second sides of the data storage tape.

* * * * *